US012156849B2

(12) United States Patent
Diubaldi et al.

(10) Patent No.: US 12,156,849 B2
(45) Date of Patent: Dec. 3, 2024

(54) SMART PILL BOTTLE CAPS

(71) Applicant: JANSSEN BIOTECH, INC., Horsham, PA (US)

(72) Inventors: Anthony R. Diubaldi, Jackson, NJ (US); Michael Hutchinson, King of Prussia, PA (US); Peter Krulevitch, Pleasanton, CA (US)

(73) Assignee: JANSSEN BIOTECH, INC., Horsham, PA (US)

( * ) Notice: Subject to any disclaimer, the term of this patent is extended or adjusted under 35 U.S.C. 154(b) by 0 days.

(21) Appl. No.: 17/783,807

(22) PCT Filed: Dec. 10, 2020

(86) PCT No.: PCT/IB2020/061756
§ 371 (c)(1),
(2) Date: Jun. 9, 2022

(87) PCT Pub. No.: WO2021/116973
PCT Pub. Date: Jun. 17, 2021

(65) Prior Publication Data

US 2023/0013732 A1 Jan. 19, 2023

Related U.S. Application Data

(60) Provisional application No. 62/947,165, filed on Dec. 12, 2019.

(51) Int. Cl.
*A61J 1/03* (2023.01)

(52) U.S. Cl.
CPC .............. *A61J 1/03* (2013.01); *A61J 2200/74* (2013.01); *A61J 2205/60* (2013.01)

(58) Field of Classification Search
CPC .......... A61J 1/03; A61J 1/035; A61J 2200/74; A61J 2205/60; A61J 7/04
(Continued)

(56) References Cited

U.S. PATENT DOCUMENTS 8,727,180 B2 * 5/2014 Zonana .............. B65D 83/0409 221/288
9,621,974 B2 * 4/2017 Mohindra ............ B65D 51/248
(Continued)

FOREIGN PATENT DOCUMENTS

| | | | |
|---|---|---|---|
| JP | 2019-504309 | A | 2/2019 |
| WO | 2017/103919 | A1 | 6/2017 |
| WO | WO 2017/199255 | A1 | 11/2017 |

OTHER PUBLICATIONS

International Search Report dated Sep. 18, 2021; International Application No. PCT/IB2020/061756.

*Primary Examiner* — Bryon P Gehman
(74) *Attorney, Agent, or Firm* — Craig M. Brown

(57) ABSTRACT

Smart pill bottle caps are provided. In general, a smart pill bottle cap can include a housing. The housing can include a sensor that is configured to monitor one or more characteristics of a pill bottle to which the housing is attached and can include a communication mechanism configured to communicate the one or more characteristics of the pill bottle to an external device. The communicated characteristic(s) of the pill bottle can be used to track usage of pills in the pill bottle, such as a date and time of when a pill was taken and/or a number of pills remaining in the pill bottle. A smart pill bottle cap can also be configured to engage a secondary, standard pill bottle cap that is used with a standard pill bottle.

21 Claims, 8 Drawing Sheets

(58) Field of Classification Search
USPC .......................................................... 206/534
See application file for complete search history.

(56) References Cited

U.S. PATENT DOCUMENTS

| | | | | |
|---|---|---|---|---|
| 9,730,860 | B2 * | 8/2017 | Hamilton | A61J 7/04 |
| 9,740,828 | B2 * | 8/2017 | Chu | G01F 22/00 |
| 9,775,780 | B2 * | 10/2017 | Afsarifard | G16H 20/13 |
| 10,874,587 | B2 * | 12/2020 | Kaplan | A61J 7/04 |
| 10,874,591 | B2 * | 12/2020 | Taylor | B65D 51/24 |
| 10,952,927 | B2 * | 3/2021 | Mehregany | B65D 79/02 |
| 11,730,674 | B1 * | 8/2023 | Schleicher | A61J 1/1412 206/528 |
| 11,826,314 | B2 * | 11/2023 | Sirdeshmukh | G16H 10/20 |
| 11,992,466 | B2 * | 5/2024 | Ozolins | A61J 1/1412 |
| 2013/0116818 | A1 | 5/2013 | Hamilton | |
| 2013/0200033 | A1 | 8/2013 | Zonana et al. | |
| 2014/0341411 | A1 | 11/2014 | Mohindra et al. | |
| 2015/0266654 | A1 | 9/2015 | Baarman et al. | |
| 2016/0324726 | A1 | 11/2016 | Roberts et al. | |
| 2018/0263854 | A1 | 9/2018 | Taylor et al. | |
| 2019/0130078 | A1 | 5/2019 | Herbert et al. | |

* cited by examiner

SMART PILL BOTTLE CAPS

CROSS REFERENCE TO RELATED APPLICATIONS

This application is the U.S. national stage of PCT Application No. PCT/IB2020/061756, filed Dec. 10, 2020, which claims priority to U.S. Provisional Patent Application No. 62/947,165, filed Dec. 12, 2019, the entire contents of each of which are hereby incorporated by reference in their entirety.

FIELD

The present disclosure relates generally to caps of pill bottles.

BACKGROUND

A significant number of people take various medications, both prescription and non-prescription, to treat a variety of limited and ongoing medical conditions, and a large number of these medications are delivered into a user's body through ingestion of a pill. Numerous treatments also require users to take pills according to strict dosing regimens, such as at a same time every day, in a specific order with other medications, without missing any days caused by forgetfulness or being unable to refill a prescription on time, etc. Additionally, in an aging population, users may forget or become confused as to which pills should be taken at what time. If an appropriate regimen is not followed, these same users run risks of increased harm or even death due to lack of treatment, despite having medication intended to address known medical conditions. Furthermore, medication may include addictive substances, providing users motivation for medication abuse.

As such, providing assistance in monitoring use and guiding consumption of various types of pills can provide greater convenience and ease of use to users and to any third parties monitoring the user and/or the medication, such as family members, medical professionals, etc.

Accordingly, there remains a need for improved caps on pill bottles.

SUMMARY

In general, smart pill bottle caps, corresponding systems, and methods for using the same are provided.

In one aspect, a pill bottle cap is provided that in one embodiment includes a housing configured to attach to a cap of a pill bottle, and the cap is configured to close the pill bottle and to be removed from the pill bottle to allow access to contents of the pill bottle. The housing includes a sensor configured to, with the housing attached to the cap, measure a characteristic of the contents. The housing includes a communication mechanism configured to transmit data corresponding to the measured characteristic to an external device.

The pill bottle cap can have any number of variations. For example, the sensor can be configured to measure a weight and the characteristic includes a weight of the contents. In at least some embodiments, the housing attached to the cap can be configured to be stored in an inverted position with the housing resting against a horizontal surface and the pill bottle and cap extending above the housing to allow the sensor to measure the weight without sensing a weight of the pill bottle or the cap. The sensor includes a force-sensing resistor, a load cell, or a pressure sensor.

For another example, the sensor can be an ultrasonic sensor, and the characteristic can include a distance between the sensor and the contents. In at least some embodiments, the housing attached to the cap can be configured to be stored in an upright position with the pill bottle resting against a horizontal surface with the housing and cap being located above the pill bottle.

For yet another example, the sensor can includes a single sensor.

For still another example, the sensor can include a plurality of sensors. In at least some embodiments, the sensor can include at least two of an accelerometer, a sensor configured to measure weight, and an ultrasonic sensor. The sensor can also include at least one of a temperature sensor, a humidity sensor, and a geographic location sensor.

For another example, the external device can be a smartphone. For yet another example, the communication mechanism can be configured to automatically transmit data to the external device when the commination mechanism connects to the external device. For another example, the communication mechanism can be configured to communicate using Bluetooth communication, cellular communication, Wi-Fi communication, near field communication, or radio frequency identification communication. For still another example, the pill bottle cap can include current date and time circuitry configured to gather time and date data, and the communication mechanism can be configured to transmit the time and date data to the external device. For another example, the housing can be configured to non-removably attach to the cap. For yet another example, the housing can be configured to removably attach to the cap such that the housing is configured to be removed from the cap and be attached to a second cap of a second pill bottle. For still yet another example, the housing can have a cavity formed therein configured to receive the cap of the pill bottle therein. In still yet another example, a plurality of longitudinal grooves can be formed in the housing surrounding the cavity, a plurality of cleats can protrude from the housing and into the cavity, the plurality of longitudinal grooves can be configured to allow the housing to flex radially outward during placement and removal of the cap of the pill bottle within the cavity, and the plurality of cleats can be configured to engage the cap of the pill bottle when the cap is received within the cavity.

For still another example, the housing can have a cavity formed therein configured to receive the cap of the pill bottle therein, the housing can have a guide plate disposed between the sensor and the cavity, and the guide plate can be configured to receive a weight of at least the contents of the pill bottle and apply the weight of the contents to the sensor. In another example, the guide plate can have a plurality of posts protruding therefrom, the housing can have a plurality of holes defined therein, and the plurality of posts can be configured to be received in the plurality of holes.

In another aspect, a pill bottle system is provided that in one embodiment includes a pill bottle configured to contain at least one pill therein, a first pill bottle cap configured to close the pill bottle, and a second pill bottle cap configured to attach to the first pill bottle cap. The second pill bottle cap includes an electronic measuring mechanism configured to measure a characteristic of the at least one pill in the pill bottle.

The pill bottle system can vary in any number of ways. For example, the characteristic can include weight, and the second pill bottle cap can be configured to rest on a horizontal support surface with the first pill bottle cap and the pill bottle extending vertically above and resting against the second pill bottle cap, thereby allowing the measuring mechanism to measure a weight of the at least one pill without sensing a weight of the pill bottle or the non-electronic pill bottle cap. In another example, the characteristic includes weight, and the second pill bottle cap can be configured to rest on a horizontal support surface with the first pill bottle cap and the pill bottle extending above and resting against the second pill bottle cap, thereby allowing the measuring mechanism to measure a weight of the at least one pill, the pill bottle, and the non-electronic pill bottle cap. In at least some embodiments, the measuring mechanism can be configured to measure date and time to allow the measured characteristic to be date and time stamped, and/or the measuring mechanism can be configured to measure at least one of an ambient temperature, an ambient humidity, and motion.

For another example, the characteristic can include distance between the measuring mechanism and the at least one pill, and the pill bottle can be configured to rest on a horizontal support surface with the first pill bottle cap and the second pill bottle cap located vertically above the pill bottle. For yet another example, the measuring mechanism can include a sensor. For still another example, the second pill bottle cap can include a power source, a processor, and a memory.

For another example, the second pill bottle cap can include a communication mechanism configured to wirelessly transmit data measured by the measuring mechanism to a remote computer system. In at least some embodiments, the transmission can be wireless transmission using Bluetooth communication, cellular communication, Wi-Fi communication, near field communication, or radio frequency identification communication; the communication mechanism can be configured to receive a request for data from the remote computing device; the remote computer system can include a smartphone; the remote computer system can be configured to scan a label on the pill bottle and access information corresponding to the at least one pill; and/or the communication mechanism can be configured to transmit the measured characteristic to the remote computer system to allow the remote computer system to determine a total quantity of the at least one pill in the pill bottle.

For still another example, the second pill bottle cap can be configured to be removed from the first pill bottle cap. In at least some embodiments, the pill bottle system can include a second pill bottle configured to contain at least one pill therein, and a third pill bottle cap configured to close the second pill bottle and configured to attach to the second pill bottle cap.

For another example, the second pill bottle cap can be configured to be non-removably attached to the first pill bottle cap. In one example, the second pill bottle cap can have a cavity formed therein configured to receive the first pill bottle cap therein, a plurality of longitudinal grooves can be formed in the second pill bottle cap surrounding the cavity, and a plurality of cleats can protrude from the second pill bottle cap into the cavity. The plurality of longitudinal grooves can be configured to allow the second pill bottle cap to flex radially outward during placement and removal of the first pill bottle cap within the cavity, and the plurality of cleats can be configured to engage the first pill bottle cap when the first pill bottle cap is received within the cavity.

In still another example, the second pill bottle cap can have a cavity formed therein configured to receive the first pill bottle cap, the second pill bottle cap can have a guide plate disposed between the electronic measuring mechanism and the cavity, and the guide plate can be configured to receive a weight of the at least one pill and apply the weight to the electronic measuring mechanism.

For yet another example, the first pill bottle cap can be non-electronic. For still another example, the at least one pill can be an abiraterone acetate pill.

In another aspect, a method of using a smart pill bottle cap is provided and in one embodiment includes sensing, using a sensor of a first pill bottle cap engaged with an assembly including a pill bottle and a second pill bottle cap, at least one characteristic of the assembly. The pill bottle has at least one pill therein, and the first pill bottle cap is resting on a horizontal support surface with the assembly extending vertically above and resting against the first pill bottle cap. The method also includes transmitting, using a communication mechanism of the first pill bottle cap, data indicative of the sensed at least one characteristic to a device external to the first pill bottle cap and the assembly.

The method can have any number of variations. For example, the at least one characteristic can includes a weight of the at least one pill. In at least some embodiments, using the device, analyzing the data to determine a number of pills in the pill bottle based on a predetermined weight of a single pill. The at least one characteristic can include date and time to allow the sensed weight to be date and time stamped and/or the at least one characteristic can include one or more of an ambient temperature, an ambient humidity, and motion. In at least some embodiments, the first pill bottle cap resting on the horizontal support surface with the assembly extending vertically above and resting against the first pill bottle cap can allow the sensor to sense the weight of the at least one pill without sensing a weight of the pill bottle or the second pill bottle cap. In at least some embodiments, the first pill bottle cap resting on the horizontal support surface with the assembly extending vertically above and resting against the first pill bottle cap can allow the sensor to sense the weight of the at least one pill, a weight of the pill bottle, and a weight of the second pill bottle cap.

For still another example, the transmission can be wireless transmission using Bluetooth communication, cellular communication, Wi-Fi communication, near field communication, or radio frequency identification communication.

For another example, after the first pill bottle cap has been removed from the assembly and has been engaged with a second assembly including a second pill bottle and a third pill bottle cap, the method can include sensing, using the sensor of the first pill bottle cap engaged with the second assembly, at least one characteristic of the second assembly. The second pill bottle can have at least one pill therein, and the first pill bottle cap can be resting on a horizontal support surface with the second assembly extending vertically above and resting against the first pill bottle cap. The method can also include transmitting, using the communication mechanism of the first pill bottle cap, data indicative of the sensed at least one characteristic of the second assembly to the device external to the first pill bottle cap and the second assembly.

For still another example, the first pill bottle cap can be non-removably engaged with the assembly. For yet another example, the at least one pill can be an abiraterone acetate pill.

DESCRIPTION OF DRAWINGS

This invention will be more fully understood from the following detailed description taken in conjunction with the accompanying drawings, in which.

DETAILED DESCRIPTION

Figure 1A:
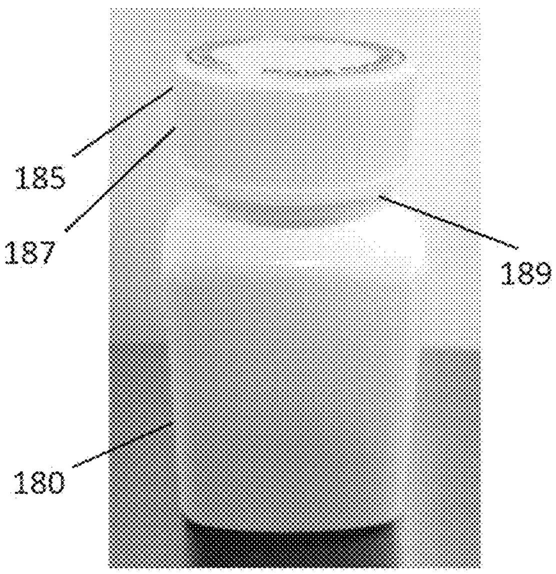
FIG. 1A is a side perspective view of one embodiment of a standard pill bottle with a standard pill bottle cap.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used. Like reference symbols in the various drawings indicate like elements.

Various exemplary smart pill bottle caps, corresponding systems, and methods for using the same are provided. The present disclosure generally relates to smart pill bottle caps (also referred to herein as "smart caps") configured to be attached to a pill bottle and that include one or more sensing and/or communication functionalities incorporated therein. The smart pill bottle caps provided herein can be used to track one or more of a variety of elements of an engaged pill bottle (e.g., a pill bottle to which the smart pill bottle cap is engaged), such as weight, volume, situational condition, environmental condition, movement, current date and time, etc. Using such information, a smart pill bottle cap can assist in monitoring general usage of any pills contained within the bottle, such as how many pills remain in the bottle, whether pills are being taken according to a prescribed dosage regimen, whether pills are being stored in correct environmental conditions and handled in correct ways to maintain effectiveness of the pills, whether a pill bottle has been tampered with, etc. This information can be provided to a user, such as a person taking pills stored in the pill bottle, family members monitoring the care of a user, and/or a medical professional, and any necessary action can be taken in response to the information. This information can be provided to medical professionals to allow monitoring of any medication and/or behavior of a patient, for example during clinical trials. Through use of this information in relation to clinical trials, various medical professionals can ensure improved clinical data, for example by verifying that patients took medication in a timely manner and/or that the medication did not undergo any detrimental environmental exposures (such as exposure to high or low temperatures, excessive humidity, etc.). The smart pill bottle cap can be configured to electronically connect to one or more external devices, such as a remote server or a smartphone containing a corresponding smartphone program application or app, and the information gathered by the smart pill bottle cap can be shared with the external device(s) for analysis, display, verification, guidance, corrective action, etc.

The smart cap can be configured to be non-removably attached to a pill bottle, which may help prevent tampering and/or help ensure that the smart cap is used when the pill bottle contains pills therein for a patient. In other embodiments, the smart cap can be configured to be removably attached to a pill bottle, which may allow the smart cap to be reused and transferred from pill bottle to pill bottle (e.g., from prescription to prescription), may reduce overall cost since only one smart cap need be purchased for multiple pill bottles, may reduce the learning curve for a user, and/or allow for more standardized manufacturing of smart caps.

In one exemplary embodiment, a smart pill bottle cap is provided that includes a housing that is configured to engage a secondary pill bottle cap that itself is removably engaged with a pill bottle. The housing includes at least one sensor configured to measure information about the pill bottle. For example, the sensor(s) can monitor one or more of weight, temperature, movement, etc. of the pill bottle and any pills therein. The housing also includes a communication mechanism that is configured to communicate the measured information to one or more external devices, such as a remote server, a smartphone, etc. By attaching (removably or non-removably) the smart pill bottle cap including the sensor and the communication mechanism to a secondary pill bottle cap, no contact occurs between the smart pill bottle cap and any pills in the pill bottle, which may reduce manufacturing and regulatory concerns, allow any tamper-resistant features of existing pill bottle caps and existing pill bottles to be preserved, allow any child-resistant features of existing pill bottle caps and existing pill bottles to be preserved, and/or allow current manufacturing and filling of existing pill bottles and existing pill bottle caps to be preserved.

The pills in the pill bottles described herein can be any of a variety of medications, such as Zytiga® (abiraterone acetate).

FIGS. 1B-5 illustrate one embodiment of a smart pill bottle cap 100 that is configured to engage a standard, non-electronic pill bottle cap 185 (FIGS. 1A and 3) configured to screw or otherwise removably attach to a standard, non-electronic pill bottle 180 (FIGS. 1A and 3) and is configured to monitor information about the standard pill bottle 180. For example, the pill bottle cap 100 is configured to measure a weight of one or more pills 182 (FIG. 3) within the standard pill bottle 180 with the standard pill bottle cap (also referred to herein as a "standard cap") 185 engaged therewith and to communicate the weight to an external device 190 such that a number of remaining pills 182 in the standard pill bottle can be determined.

Figure 3:
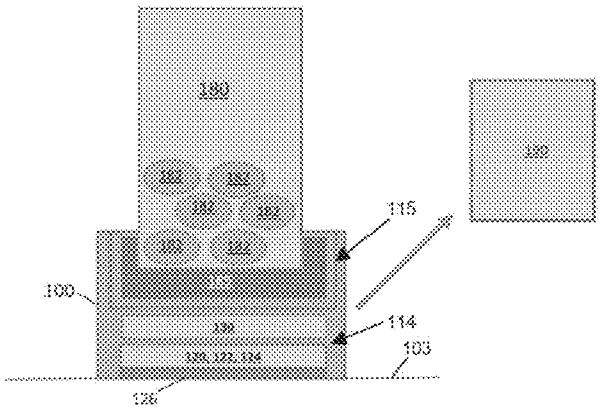
FIG. 3 is a partial cross-sectional block diagram of the standard pill bottle, the standard pill bottle cap, and the smart pill bottle cap of FIG. 1B and an external device.

As illustrated in FIG. 3, with the smart cap 100 engaged with the standard pill bottle cap 185, the standard pill bottle 180, the standard pill bottle cap 185, and the smart pill bottle cap 100 are configured to be stored as an assembly in an inverted position with the smart cap 100 resting on a horizontal surface 103, e.g., a tabletop, a storage shelf, a countertop, a windowsill, etc., with the standard pill bottle cap 185 and standard pill bottle 180 extending upwardtherefrom, e.g., vertically or substantially vertically. This configuration is considered "inverted" because a standard pill bottle 180 is typically stored in a so-called "upright" position in which a bottom exterior surface of the standard pill bottle 180 rests on the horizontal surface 103 with the standard pill bottle cap 185 located above the standard pill bottle 180. In the inverted position, the bottom exterior surface of the standard pill bottle 180 faces upward, e.g., away from the horizontal surface 103, instead of facing downward, e.g., toward the horizontal surface 103. The inverted position can allow the smart cap 100 to measure a combined weight of the standard pill bottle 180, the standard pill bottle cap 185, and any pills stored therein, as discussed in detail below. While standard pill bottles and caps provided for home use from local pharmacies are discussed herein, the smart pill bottle cap 100 can be resized as needed to engage additional pill bottles and caps of various sizes and shapes, such as larger dispensing bottles or containers used in a pharmacy or hospital setting.

The smart pill bottle cap 100 includes an outer shell or housing 102, a monitoring mechanism 120, a power source 122 (e.g., a lithium button cell battery, a coin cell battery, a rechargeable battery, etc.), a spacer 124, a cover 126, and a guide plate 130. The housing 102 is configured to house various components of the smart cap 100 therein. The housing 102 has a base portion 104 and a sidewall 105 extending longitudinally from the base portion 104 that define a hollow interior area 108 (FIG. 4) including a first cavity 114 (FIGS. 3 and 5), in which the various components of the smart pill bottle cap 100 can be housed, and a second cavity 115 (FIG. 3) configured to receive the standard pill bottle cap 185 therein. In the illustrated embodiment, the housing 102 (e.g., the first cavity 114 thereof) has disposed therein electronic components of the smart cap 100, e.g., the monitoring mechanism 120 and the power source 122, and the spacer 124 that is configured to facilitate positioning of the monitoring mechanism 120 and the power source 122 in the housing 102. The cover 126 closes the first cavity 114 and defines at least a portion of a top or upper surface of the housing 102, and the guide plate 130 defines at least a portion of a bottom or lower surface of the housing 102. As shown in FIG. 3, in the inverted position, the cover 126 rests on the horizontal surface 103, as does a top, outward-facing surface 104*b* of the base portion 104 of the smart cap 100.

The smart cap 100, e.g., the housing 102 thereof, is configured to engage the standard pill bottle cap 185 such that a user can remove and reattach the standard pill bottle cap 185 from a standard pill bottle 180 per standard use without disengaging the smart cap 100 from the standard cap 185. As such, normal functionality of the standard pill bottle cap 185, including any tamper-proofing and/or child-proofing mechanisms, are not affected by engagement of the smart pill bottle cap 100 to the standard cap 185.

Figure 4:
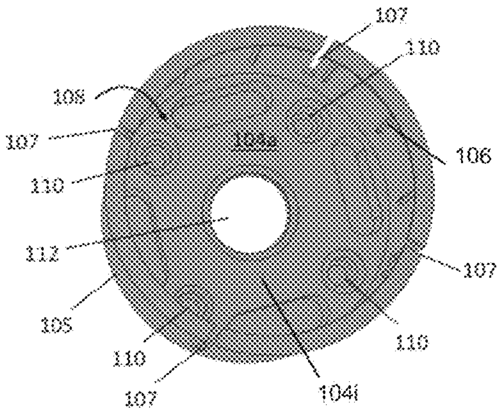
FIG. 4 is a bottom up perspective view of the smart cap of FIG. 1B.

The sidewalls 105 of the housing 102 extend around the standard pill bottle cap 185 when the standard cap 185 is in the cavity 115 to removably secure the smart pill bottle cap 100 into engagement with the standard cap 185 while allowing the standard cap 185 to operate normally when engaged to the standard pill bottle 180. The sidewalls 105, as illustrated in FIG. 4, have a plurality of cleats 106 located on surfaces facing inward toward the hollow interior area 108 (e.g., the cap cavity 115 thereof) that are configured to grip the standard pill bottle cap 185 when the standard cap 185 is received in the hollow interior area 108 (e.g., to the cap cavity 115) by the standard cap 185 being pushed therein or the smart cap 100 being pushed onto the standard cap 100.

Figure 1B:
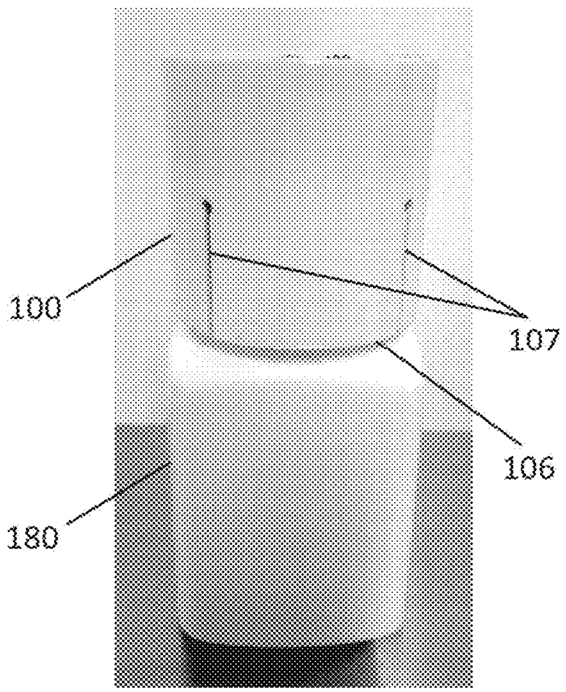
FIG. 1B is a side perspective view of the standard pill bottle and standard pill bottle cap of FIG. 1A with one embodiment of a smart pill bottle cap placed thereon.

As shown in FIGS. 1B-2B and 5, longitudinal grooves 107 are formed in the sidewalls 105 and extend along a partial longitudinal length of the sidewalls 105 from the bottom up, e.g., from the side of the housing 102 having the cap cavity 115 formed therein. Multiple grooves 107 are present in this illustrated embodiment, but only one groove 107 can be present. The grooves 107 are configured to allow the sidewalls 105 and the plurality of cleats 106 to flex or bend radially outward when the standard cap 185 is being received in the cap cavity 115 and to flex or bend radially inward thereafter to secure the cleats 106 into engagement with the standard cap 185 when the standard cap 185 is fully inserted into the housing 102, e.g., into the cap cavity 115. The sidewalls 105 of the smart cap 100 engage outer radial walls 187 of the standard cap 185, and the cleats 106 of the smart cap 100 engage a radial edge 189 of the standard cap 185, as illustrated in FIGS. 1A and 1B. However, a variety of different approaches can be taken to removably securing the smart pill bottle cap 100 and the standard pill bottle cap 185 together, such as through friction fit, stretchable or elastic material, snaps, hooks, various screwing or threading mechanisms, magnets, adhesives, high-friction pads or grips, etc. As such, in some embodiments, the cleats 106 and/or grooves 107 can be excluded and/or replaced by one or more of the securing means provided above.

To remove, the smart cap 100 can be pulled proximally away from the standard cap 185, causing the sidewalls 105 and the plurality of cleats 106 to flex or bend radially outward to release the outer radial walls 187 and the radial edge 189 of the standard cap 185. However, similar to the discussion above regarding removably securing the smart pill bottle cap 100 and the standard pill bottle cap 185 together, a variety of approaches can be taken to removing the smart cap 100 depending on the approach taken to secure the cap 100 initially, such as through applying necessary force to stretch material or sever magnetic engagements, unsnapping or unhooking various engagements, rotating various screwing or threading mechanisms, applying various solutions to dissolve or release adhesives, etc.

In some embodiments, a smart cap is configured to non-removably seat a standard pill bottle cap therein such that attempts to remove the smart cap would destroy or render inoperable the smart cap. For example, the smart cap can include one or more uni-directional hooks configured to flex or bend in only one direction such that the hooks can flex or bend in one direction to allow the standard cap to be received in the smart cap and retain the standard cap therein while being unable to flex or bend in the opposite direction so as to prevent the standard cap from being removed from the smart cap. For another example, adhesive can be applied to fixedly secure the standard and smart caps together.

Figure 5:
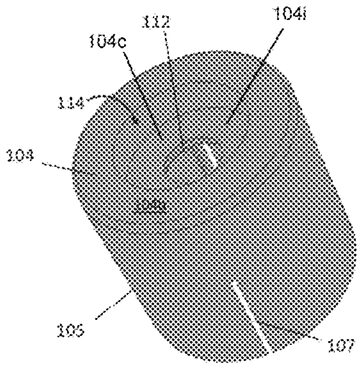
FIG. 5 is a side perspective view of a portion of the smart cap of FIG. 1B.

Referring again to the smart cap 100 of FIGS. 1B-5, as illustrated in FIGS. 4 and 5, the base 104 includes a separation member **104*i* in the hollow area 108 that defines a boundary between the first and second cavities 114, 115. A first surface 104*c* of the separation member 104*i* faces toward the monitoring cavity 114 and a top of the smart cap 100. The first surface 104*c* is configured to seat the monitoring mechanism 120 thereon. The monitoring mechanism 120 covers the first surface 104*c* when the smart cap 100 is assembled as shown in FIGS. 1B, 2A, and 3. The separation member 104*i* includes a second surface 104*a* opposite the first surface 104*c* that faces toward the cap cavity 115 and a bottom of the smart cap 100. The inward-facing surface 104*a* has a plurality of pilot cavities or holes 110 defined therein that are configured to receive guide protrusions 136 extending from the guide plate 130, discussed in more detail below. The separation member 104*i* is in the form of a ring and has an opening or channel 112 extending therethrough that is configured to receive a center raised surface 138 of the guide plate 130**, discussed in more detail below.

Figure 2A:
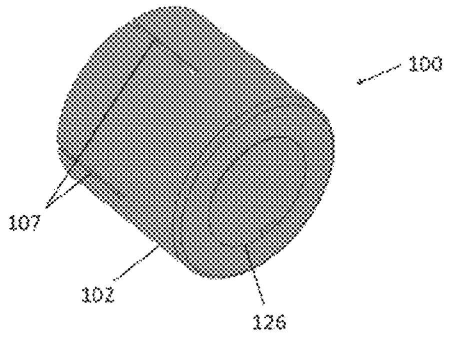
FIG. 2A is a side perspective view of the smart pill bottle cap of FIG. 1A.
Figure 2B:
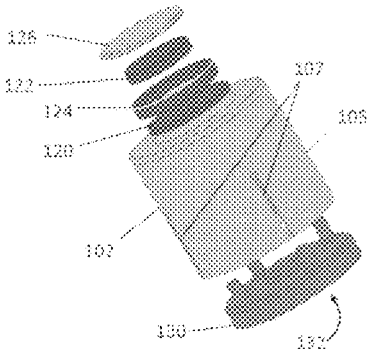
FIG. 2B is an exploded side perspective view of the cap of FIG. 1B.
Figure 6:
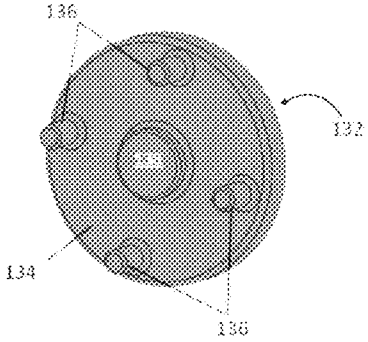
FIG. 6 is a perspective view of a guide plate of the smart cap of FIG. 1B.
Figure 7:
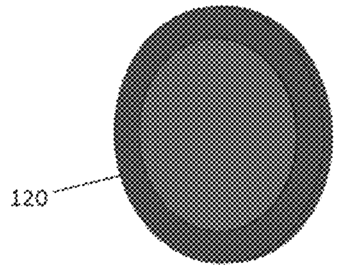
FIG. 7 is a perspective view of a monitoring mechanism of the smart cap of FIG. 1B.

The guide plate 130, illustrated in FIGS. 2B, 3, and 6, is movably disposed in the hollow area 108 of the housing 102. The guide plate 130 is configured to move relative to the housing 102 to facilitate the monitoring mechanism's gathering of data, as discussed further below. The guide plate 130 covers the second surface **104*a* when the smart cap 100 is assembled as shown in FIGS. 1 and 3. The guide plate 130 is configured to provide a flat, even receiving surface 132 configured to receive the standard cap 185 thereon. The standard cap 185 attached to the pill bottle 180 and any pills within the pill bottle 180 can therefore rest on the guide plate 130 when the assembly of the smart cap 100, standard cap 185, and pill bottle 180 are in the inverted orientation shown in FIG. 3**.

The guide plate 130 has the guide protrusions 136 extending from a second surface 134 opposite the receiving surface 132 that faces toward the top of the housing 102, e.g., toward the first cavity 114. The guide protrusions 136 are inserted into the corresponding pilot holes 110 of the base portion 104, e.g., the separation member **104*i* thereof, during assembly of the smart pill bottle cap 100 to ensure correct alignment and placement of the guide plate 130 within the housing 102. The guide protrusions 136 and the pilot holes 110 have respective longitudinal lengths that allow the guide protrusions 136 to remain seated in the pilot holes 110 regardless of the orientation of the smart cap 100 and regardless of the longitudinal position of the guide plate 130 within the smart cap 100 with the standard cap 185 attached thereto. The guide protrusions 136 and the pilot holes 110 cooperate to maintain the smart cap 100 is a fixed rotational position relative to the standard cap 185 attached thereto. The standard cap 185 can thus be rotated to be selectively attached to and removed from the pill bottle 180 with the smart cap 100 rotating with the standard cap 185 and without the smart cap 100 becoming unattached from the standard cap 185. Additionally, the guide protrusions 136 can limit travel of the guide plate 130 toward the monitoring mechanism 120 to establish a maximum displacement of the guide plate 130, in effect setting a maximum weight sensing limit on the monitoring mechanism 120. By setting a limit, the monitoring mechanism 120 can be protected from damage due to excess weight or impact force being applied to the monitoring mechanism 120, such as might be caused by a user stacking heavy objects on the bottle 180 and/or the smart cap 100, dropping the bottle 180 and/or the smart cap 100**, etc.

The guide plate 130 includes the center raised surface 138 protruding from the secondary surface 134. The center raised surface 138 extends through the channel 112 of the base portion 104 when the guide plate 130 is positioned in the housing 102. Because the channel 112 connects the cap cavity 115 and the monitoring cavity 114, the raised surface 138 of the guide plate 130 extends partially into the monitoring cavity 114 and is configured to contact or engage the monitoring mechanism 120 when the smart pill bottle cap 100 is assembled. The raised surface 138 is configured to move longitudinally within the channel 112, e.g., along a longitudinal axis of the channel 112 which is also a longitudinal axis of the housing 102.

In some embodiments, a securing mechanism can be added between the receiving surface 132 and a top surface of the standard cap 185. For example, pad(s), grip(s), etc. can be mounted to the receiving surface 132 to assist in securing the smart cap 100 to the standard cap 185 and in removing and reattaching the standard cap 185 to the pill bottle 180. The securing mechanism can be made from a variety of materials, such as rubber or other material configured to provide friction between the standard cap 185 and the guide plate 130. In one embodiment, the securing mechanism includes a rubber pad that is between approximately 0.1 mm and 3 mm thick. A person skilled in the art will appreciate that the thickness may not be precisely at a value but nevertheless may be considered to be approximately at that value due to any number of factors, such as manufacturing tolerances and sensitivity of measurement equipment.

The monitoring mechanism 120 is disposed in the monitoring cavity 114 and is configured to measure a characteristic of contents of the pill bottle 180 to which the smart cap 100 is attached via the standard cap 185. In an exemplary embodiment, the monitoring mechanism 120 includes a sensor (which can include one or more individual sensors). In this illustrated embodiment, the monitoring mechanism 120, with the smart cap 100 attached to the standard cap 185 and with the pill bottle 180 attached to the standard cap 185, is configured to measure a weight of the pill bottle 180, standard cap 185, and any pills within the pill bottle 180. The monitoring mechanism 120 can be configured to measure the weight in any of a variety of ways, such as by including a force-sensing resistor (or other force-measuring sensor), a pressure sensor, a load cell, etc. The monitoring mechanism 120 of this illustrated embodiment is a force-measuring sensor, such as a load cell with a strain gauge.

When the standard pill bottle 180, standard pill bottle cap 185, and smart pill bottle cap 100 are arranged in an inverted position, for example as illustrated in FIG. 3, the pill bottle 180, the standard cap 185, and any pills within the pill bottle 180 rests on the receiving surface 132 of the guide plate 130. The pill bottle 180, the standard cap 185, and any pills 182 within the pill bottle 180 thereby apply a force to the guide plate 130 in a downward vertical or substantially vertical direction, e.g., toward the horizontal surface 103. The raised surface 138 of the guide plate 130 is configured to distribute the load applied to the guide plate 130 to the monitoring mechanism 120 such that a downward force applied to the monitoring mechanism 120 corresponds to the downward force applied to the guide plate 130 by the pill bottle 180, the standard cap 185, and any pills 182 within the pill bottle 180. As such, the monitoring mechanism 120 can measure a change in downward force (and corresponding weight) of the combination of the pill bottle 180, the standard cap 185, and any pills 182.

The guide plate 130 is therefore configured to "float" within the housing 102, e.g., by the guide plate 130 moving in the cap cavity 115 with the raised surface 138 moving within the channel 112 and the protrusions 136 riding in the pilot holes 110. The guide plate 130 is thus configured to be movably captured between the separation member **104*i* and the standard pill cap 185. The weight of the standard cap 185, standard pill bottle 180, and the pill(s) 182 inside the pill bottle 180 defines how much force is applied to the guide plate 130 and thus how much the guide plate 130 moves in the channel 112 and how much force is applied to the monitoring mechanism 120 that underlies the guide plate 130, standard cap 185, standard pill bottle 180, and the pill(s) 182 when the assembly is in the inverted position shown in FIG. 3. When the assembly is not inverted, no weight is being applied to the monitoring mechanism 120. In other words, when the assembly including the smart cap 100, standard cap 185, and standard bottle 180 is in the upright position, the guide plate 130 is in a lowermost position relative to the housing 102, e.g., in a position nearest the bottom of the housing 102, since gravity will urge the guide plate 130 downward. The monitoring mechanism 120 will therefore measure no force, which is indicative of the assembly being in the upright position since the monitoring mechanism 120 is not even measuring an empty bottle, e.g., the weight of the pill bottle 180 and the standard cap 185 without any pills 182 being contained in the bottle 180. When the assembly is in the inverted position, the guide plate 130 is urged toward an uppermost position relative to the housing 102, e.g., urged toward the top of the housing 102 that is resting on the horizontal surface 103, due to pressure applied thereto by the standard cap 185, pill bottle 180, and any pills 182 contained in the pill bottle 180**.

Figure 8:
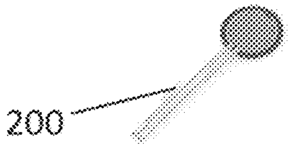
FIG. 8 is a perspective view of one embodiment of a force-sensing resistor.

While the monitoring mechanism 120 includes a force-measuring sensor, a variety of monitoring mechanisms can be used with the monitoring mechanism 120 including a single sensor or a plurality of sensors. FIG. 8 illustrates one embodiment of a force-sensing resistor 200. The force-sensing resistor 200 can include a conductive polymer, which changes resistance in a predictable manner following application of force to its surface and can be incorporated into the smart cap 100 in a variety of ways, for example as a polymer sheet or ink that can be applied by screen printing. Applying a force to the surface of the sensing film of the resistor 200 can cause particles to touch conducting electrodes, changing a resistance of the film. The force-sensing resistor 200 can operate satisfactorily in hostile environments, can be small in size (such as having a thickness of less than 0.5 mm), can be inexpensive, and can have good shock resistance. Thus, as weight of the pill bottle 180, cap 185 and any pills in the pill bottle 180 rest on the resistor 200, a proportional and measurable change in resistance of the resistor 200 can occur, which will proportionally correspond to a change in force and thus a change in weight.

The monitoring mechanism 120 can include a printed circuit board (PCB) that can include sensor(s) configured to sense temperature (using a temperature sensor such as a thermistor, a thermocoupler, etc.), humidity (using a thermistor, a humistor, a hygrometer, etc.), voltage (e.g., using a voltage detector, etc. or using a current sensor from which voltage can be calculated), weight (e.g., using a force-sensing sensor, a load cell, a pressure sensor, etc.), and/or date and/or time (using a clock generator, a timer, etc.).

Figure 8A:
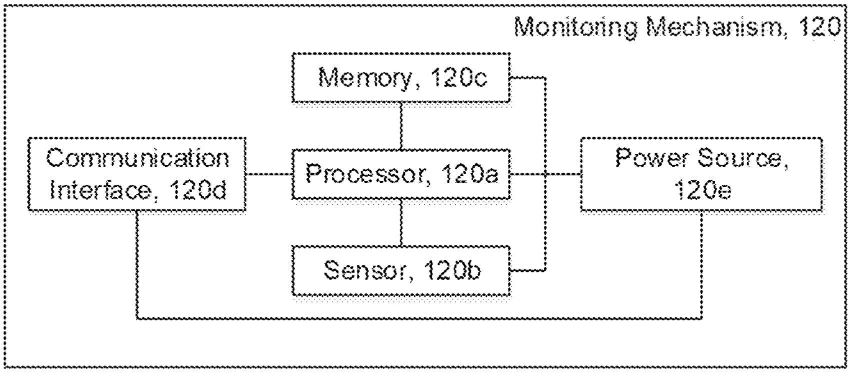
FIG. 8A is a schematic view of the monitoring mechanism of FIG. 7.

The monitoring mechanism 120 includes a variety of electronic components to facilitate the gathering of data and the transmission of gathered data to an external device 190. FIG. 8A illustrates one embodiment of the electronic components of the smart cap 100, which in this illustrated embodiment are part of the monitoring mechanism 120. The monitoring mechanism 120 includes a processor **120*a*, a sensor 120*b* configured to monitor characteristic(s) as discussed herein and transmit the gathered data to the processor 120*a*, a memory 120*c* configured to receive data from the processor 120*a* for storage in the memory 120*c* and configured to store instructions therein that are executable by the processor 120*a*, and a communication interface 120*d* configured to transmit data to an external source at the instruction of the processor 120*a*. In addition to or instead of the smart cap 100 including the power source 122, the monitoring mechanism 120 can include a power source 120*e*** configured to provide power to one or more of the sensing module's other electronic components.

In an exemplary embodiment the monitoring mechanism's electronic components are mechanically supported on a PCB and electrically connected to one another as needed on the PCB. To facilitate the electrical connections, the PCB can include a bus system, e.g., one or more separate physical buses, communication lines/interfaces, and/or multi-drop or point-to-point connections, connected by appropriate bridges, adapters, and/or controllers. The PCB can be flexible, which may reduce a profile of the PCB and hence reduce a profile of the smart cap 100. Alternatively, the PCB can be rigid, which may provide durability to the smart cap 100.

The processor 120*a* can include any type of microprocessor or central processing unit (CPU), including programmable general-purpose or special-purpose microprocessors and/or any one of a variety of proprietary or commercially available single or multi-processor systems. In an exemplary embodiment the processor 120*a* is a single processor, which may help control cost and/or size of the smart cap 100.

The memory 120*c* is configured to provide storage for data, e.g., instructions (e.g., code) to be executed by the processor 120*a* and data gathered by the sensor 120*b*. The memory 120*c* can include storage using, e.g., read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The communication interface 120*d* (also referred to herein as a "communication mechanism") is configured to enable communication over a network with sources external to the smart cap 100 and the pill bottle 180 and standard cap 185 to which the smart cap 100 is attached. In an exemplary embodiment the communication interface 120*d* is configured to communicate wirelessly using any of a number of wireless techniques, e.g., Wi-Fi, Near Field communication (NFC), Bluetooth, Bluetooth Low Energy (BLE), cellular communication, radio frequency identification (RFID) communication, etc.

The smart cap 100 can include any of a variety of other software and/or hardware components not shown in FIG. 8A, such as an LED or other light to show communication status of the smart cap 100 (e.g., light on when the communication interface 120*d* is communicating data and light off when the communication interface 120*d* is not communicating data, etc.), to show power status of the smart cap 100 (e.g., light on when the power source 120*e* is providing power to one or more components of the smart cap 100 and light off when the power source 120*e* is not providing power to one or more components of the smart cap 100). In other embodiments, the monitoring mechanism 120 may differ in architecture and operation from that shown and described in FIG. 8A. For example, the sensor 120*b* and communication interface 120*c* can be integrated together. For another example, the processor 120*a* and communication interface 120*d* can be integrated together. For yet another example, the sensor 120*b* can include its own local memory in addition to the monitoring mechanism 120 including the memory 120*c*. For still another example, the power source can be off-board the monitoring mechanism 120, e.g., include the power source 122 but not the power source 120*e*. For another example, the sensor 120*b*, communication interface 120*d*, and processor 120*a* can be integrated together.

Figure 8B:
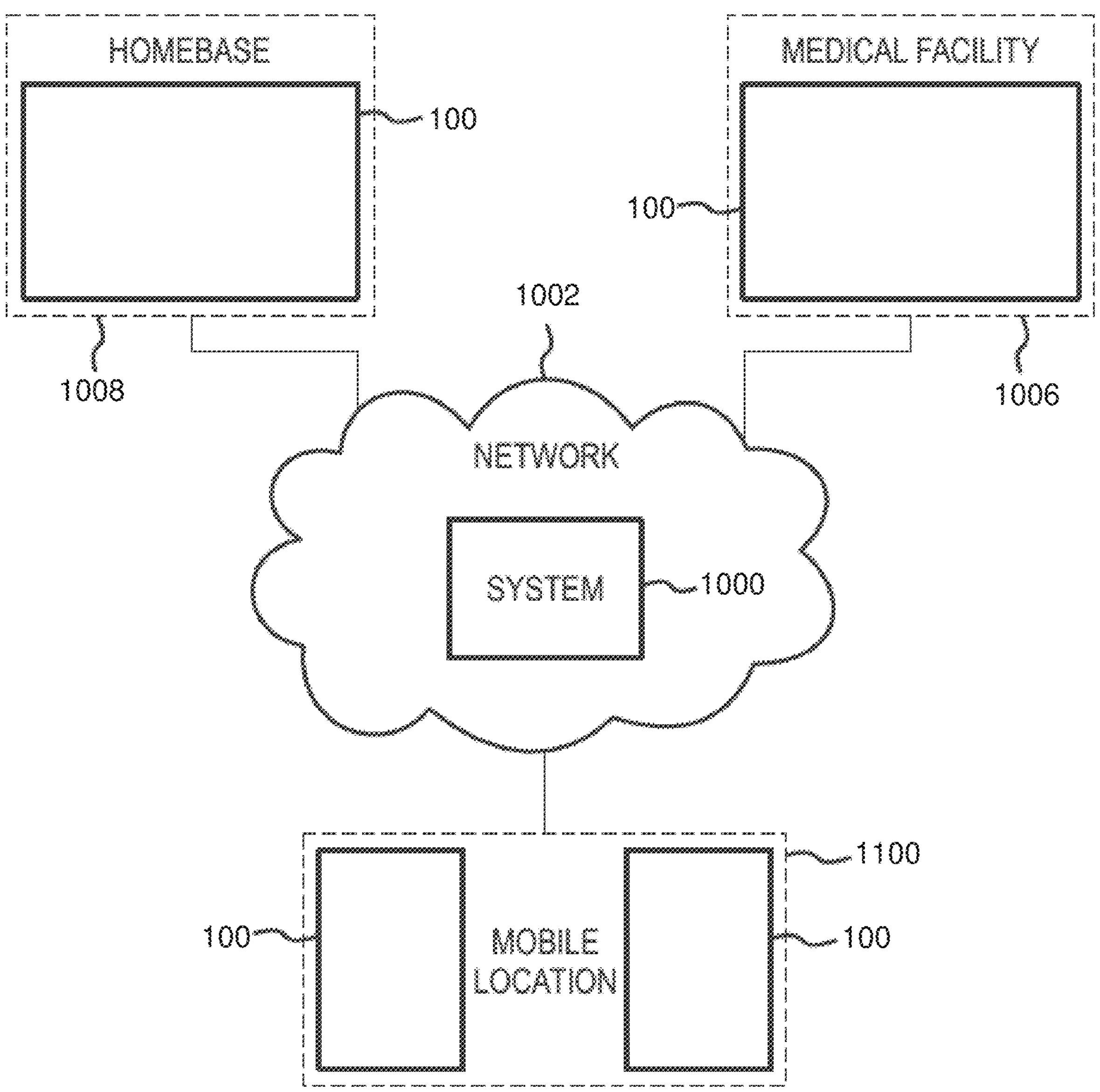
FIG. 8B is a schematic view of one embodiment of a communication network system.

The communication interface 120*d* is configured to communicate with the external source 190, such as a computer system located remotely from the smart cap 100, such as a central computer system 1000 shown in FIG. 8B. As shown in FIGS. 8A and 8B, the communication interface 120*d* is configured to communicate with the central computer system 1000 through a communication network 1002 from any number of locations where the smart cap 100 may be located, such as a medical facility 1006, e.g., a hospital or other medical care center, a home base 1008 (e.g., a patient's home or office or a care taker's home or office), or a mobile location 1100. In some embodiments, the central computer system 1000 can be located at a same location as the communication interface 120*d* but be remotely located from the central computer system at that location, e.g., the communication interface 120*d* being in one room of the home base 1008 or medical facility 1006 and the central computer system 1000 being in another room of the home base 1008 or medical facility 1006.

The communication interface 120*d* can be configured to access the system 1000 through a wired and/or wireless connection to the network 1002. In an exemplary embodiment the communication interface 120*d* is configured to access the system 1000 wirelessly using any of a number of wireless techniques, which can facilitate accessibility of the system 1000 from almost any location in the world where the smart cap 100 may be located. A person skilled in the art will appreciate that communications over the network 1002 can include security features to help protect unauthorized access to transmitted data and/or to nodes within the network 1002.

The central computer system 1000 can have any of a variety of configurations, as will be appreciated by a person skilled in the art, including components such as a processor, a communication interface, a memory, an input/output interface, and a bus system. The computer system 1000 can also include any of a variety of other software and/or hardware components, including by way of non-limiting example, operating systems and database management systems. The central computer system 1000 can be any of a variety of types of computer systems, such as a desktop computer, a workstation, a minicomputer, a laptop computer, a tablet computer, a personal digital assistant (PDA), a mobile phone, a smart watch, etc.

The computer system 1000 can include a web browser for retrieving web pages or other markup language streams, presenting those pages and/or streams (visually, aurally, or otherwise), executing scripts, controls and other code on those pages/streams, accepting user input with respect to those pages/streams (e.g., for purposes of completing input fields), issuing HyperText Transfer Protocol (HTTP) requests with respect to those pages/streams or otherwise (e.g., for submitting to a server information from the completed input fields), and so forth. The web pages or other markup language can be in HyperText Markup Language (HTML) or other conventional forms, including embedded Extensible Markup Language (XML), scripts, controls, and so forth. The computer system 100 can also include a web server for generating and/or delivering the web pages to client computer systems. The presented pages and/or streams may allow a user of the computer system 1000 to view data received by from the smart cap 100 and/or analysis of the data as performed by the computer system 1000.

Figure 9:
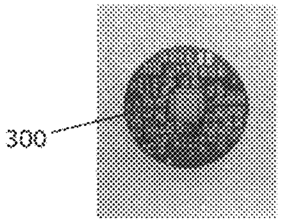
FIG. 9 is a top down view of one embodiment of a printed circuit board.

FIG. 9 illustrates one embodiment of a PCB 300 for the monitoring mechanism 120 that can incorporate one or more sensors.

Figure 10:
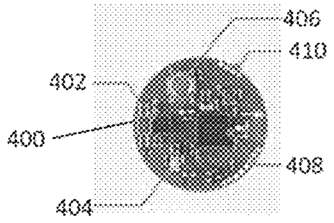
FIG. 10 is a top down view of another embodiment of a printed circuit board.

FIG. 10 illustrates another embodiment of a PCB 400 for the monitoring mechanism 120 that includes a motion sensor 402, a light-emitting diode (LED) 404, a push-button 406, a communication interface in the form of Bluetooth low energy commination circuitry 408, and various onboard memory and additional circuitry. The PCB 400 also has a plurality of additional engagement points 410 for additional sensors that can be incorporated as desired, such as pressure, temperature, light, date, orientation, moisture, impact, geographic location, etc.

Figure 3A:
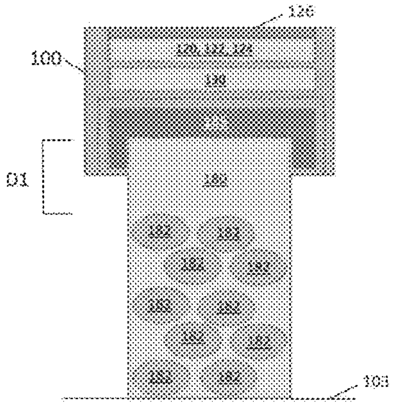
FIG. 3A is a partial cross-sectional block diagram of the standard pill bottle, the standard pill bottle cap, and the smart pill bottle cap of FIG. 1B with a first number of pills therein.
Figure 3B:
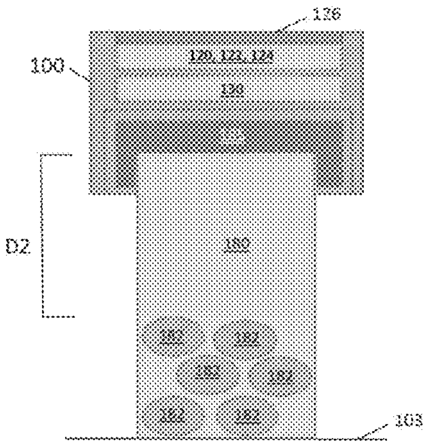
FIG. 3B is a partial cross-sectional block diagram of the standard pill bottle, the standard pill bottle cap, and the smart pill bottle cap of FIG. 3A with a second, smaller number of pills therein.

In some embodiments, the monitoring mechanism 120 is configured to facilitate measurement of how many pills 182 remain in the bottle 180 using ultrasound instead of or in addition to using weight. The monitoring mechanism 120 can thus include an ultrasonic sensor. For example as illustrated in FIGS. 3A and 3B, the pill bottle 180 can be stored in an upright position on the surface 103, and the ultrasonic sensor can be used to measure how many pills 182 remain in the bottle 180 through use of the Doppler effect. If the bottle 180 is stored upright, the pills 182 will collect at a bottom of the bottle 180 instead of against the standard cap 185 and the smart cap 100 as in the inverted position. However, the distance an ultrasonic wave travels in the bottle 180 can be measured until the wave encounters an object and is reflected back to the ultrasonic sensor. The measured distance can correspond to a number of pills 182 remaining in the bottle 180 such that, the shorter a measured distance D1 (as in FIG. 3A), the more pills 182 there are stacked up in the bottle 180, and the longer a measured distance D2 (as in FIG. 3B), the fewer pills 182 there are stacked up in the bottle 180. As such, the smart cap 100 can be designed to allow inverted storage of the bottle 180 through use of a sensor configured to measure weight, allow upright storage of the bottle 180 through use of an ultrasonic sensor, or allow both inverted and upright storage by incorporating both types of sensors therein.

The smart cap 100 can include an orientation sensor (e.g., an accelerometer, a tilt/angle switch (e.g., mercury free), a position sensor, etc.) which can be used to gather orientation data to ensure that proper orientation of the smart cap 100 is achieved before taking measurements. For example, the orientation sensor can allow determination that the assembly is in the upright position such that ultrasonic sensing is appropriate or is in the inverted position such that weight sensing is appropriate. In some embodiments, the orientation sensor can be used to activate or signal the smart cap 100 that the bottle 180 is being interacted with. For example, if a user handles the bottle 180, removes the smart cap 100, takes a pill 182 out, and/or puts the smart cap 100 and/or the bottle 182 back down, portions or all of this motion can be detected by the orientation sensor and/or can be used to trigger or activate the smart cap 100, for example to trigger a new measurement and broadcast cycle because it may be likely that the number of pills 182 has changed. Such an approach may save battery power as the smart cap 100 would not need to measure and broadcast data during long periods when the number of pills 182 has not changed because no one has touched or moved the bottle 180 or the smart cap 100. In some instances, the bottle 180 might be set on an incline, causing weight reported by the smart cap 100 to be incorrect because pills 182 may not be resting evenly on the smart cap 100. In such an instance, the orientation sensor can be used to determine an angle of the smart cap 100 (and thus the bottle 180) relative to the surface 103. Using this angle, accurate weight information can be calculated using weight sensed by the smart cap 100 and the angle of the smart cap 100 (and thus the pill bottle 180). Accurate weight information can be calculated, for example, by a weight component of the weight in each axis of the orientation sensor and is related to the sin and cos of the angle of the bottle 180.

Figure 11:
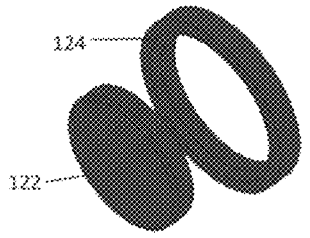
FIG. 11 is a perspective view of a power source and a spacer of the smart cap of FIG. 1B.

The spacer 124, shown in FIGS. 2B, 3, and 11, is configured to ensure correct orientation of the power source 122 and monitoring mechanism 120 within the housing 120 and is configured to provide durability. The spacer 124 can be made of cushioning material such as rubber, foam, flexible polymer, etc. to increase impact-resistance of components in the monitoring cavity 114.

Figure 12:
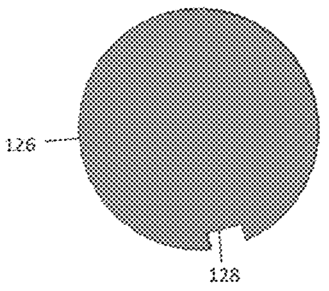
FIG. 12 is a top down view of a cover of the smart cap of FIG. 1B.

Components within the monitoring cavity 114 are held in place by the cover 126 that snaps or is otherwise secured into place over the monitoring cavity 114. As illustrated in FIG. 12, the cover 126 has a cut-out 128 therein to allow the cover 126 to be pried off after placement, for example to allow replacement or repair of the monitoring mechanism 120 or the power source 122. However, other attachment mechanisms can be used, such as threading, hooks, adhesive, etc.

EXAMPLE

Figure 28:
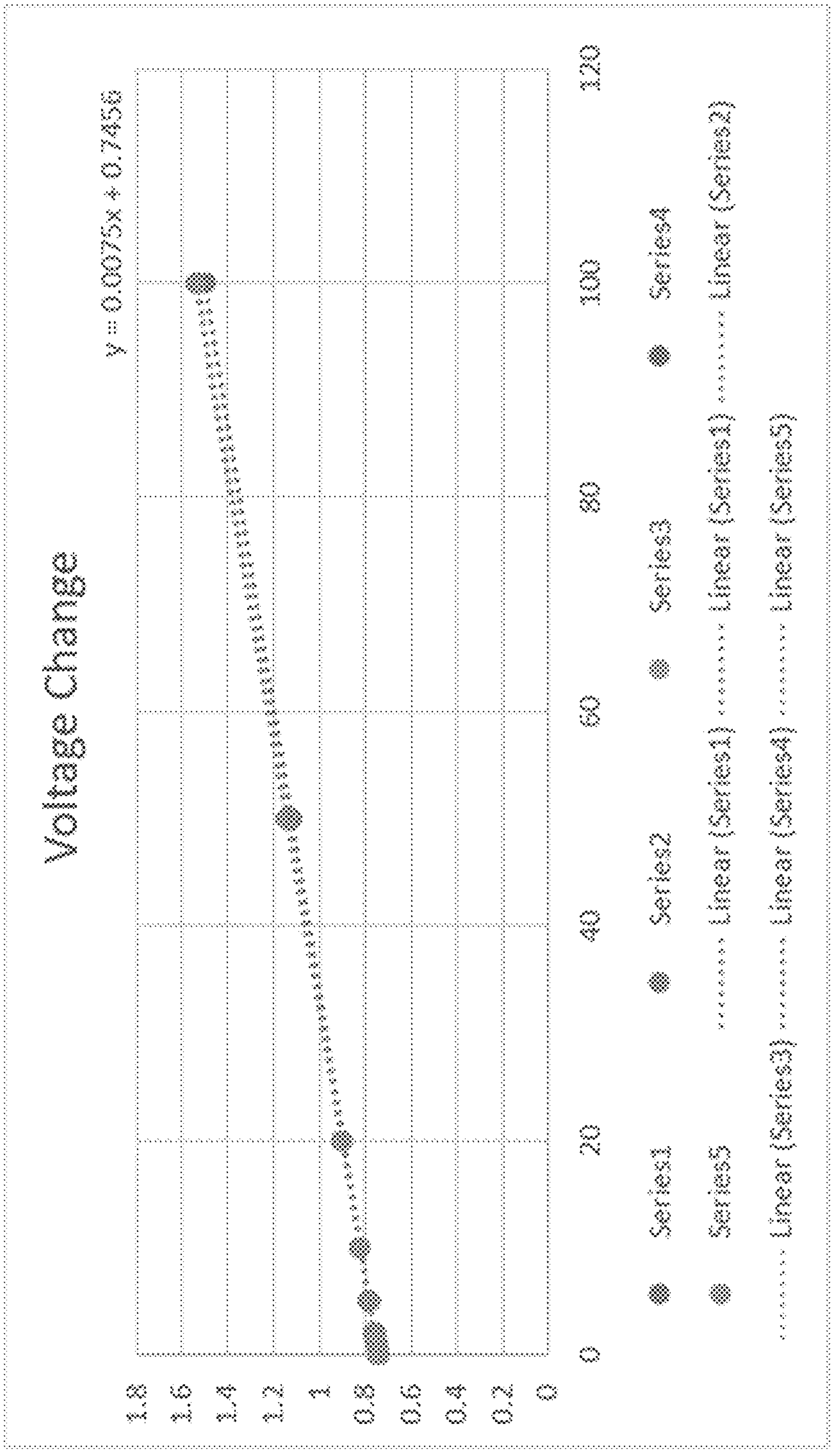
FIG. 28 is a chart showing tests conducted to illustrate that an illustrative embodiment of the smart cap can sense applied weight from approximately 1 to approximately 100 g in a linear manner.

As an example, tests were conducted to illustrate that an illustrative embodiment of the smart cap can sense applied weight from approximately 1 to approximately 100 g in a linear manner, as shown in Table 1 below and FIG. 28. A monitoring mechanism including a sensor in the tests has an output scale factor of about 7 mv/g. The electronics used in the test contained a 10 bit ADC (analog-to-digital converter), which equates to approximately 3 bits per gram of weight when determining a weight applied to the smart cap. However, higher level ADCs can be used, such as a 12 bit ADC, which will result in greater gram resolution (such as approximately 12 bits per gram when using a 12 ADC). Achieving greater gram resolution can help improve the accuracy of the smart cap when determining a weight applied to the smart cap. Smart caps with greater gram resolution can measure lighter pills and/or reduce or eliminate measurement errors.

TABLE 1

| | Weight (g) | | | | | | | |
|---|---|---|---|---|---|---|---|---|
| | 0 | 1 | 2 | 5 | 10 | 20 | 50 | 100 |
| Run 1 (V) | 0.744 | 0.751 | 0.759 | 0.782 | 0.823 | 0.901 | 1.122 | 1.496 |
| Run 2 (V) | 0.748 | 0.756 | 0.765 | 0.788 | 0.828 | 0.906 | 1.148 | 1.544 |
| Run 3 (V) | 0.746 | 0.754 | 0.762 | 0.786 | 0.824 | 0.905 | 1.139 | 1.538 |
| Run 4 (V) | 0.747 | 0.755 | 0.763 | 0.786 | 0.826 | 0.906 | 1.139 | 1.539 |
| Run 5 (V) | 0.748 | 0.755 | 0.765 | 0.788 | 0.829 | 0.906 | 1.144 | 1.543 |

In use, the smart pill bottle cap 100 is engaged with the standard cap 185. In some embodiments the smart cap 100 is engaged with the standard cap 185 by a user after the pill bottle 180 has been filled with the pills 182 and closed by the standard cap 185. In other embodiments, the smart cap 100 is engaged with the standard cap 185 as part of the manufacturing process or by a pharmacist or other authorized professional before a user receives the pill bottle 180 with the pills 182 therein.

Before or after the smart cap's engagement with the standard cap 185, the smart cap 100 can electronically communicate with the external device 190, e.g., using the communication interface 102*d* of the smart cap 100, and can provide details to the external device 190 regarding the identity, medical history, etc. of the user and/or the identity of the pills 182 contained in the pill bottle 180.

Figure 13:
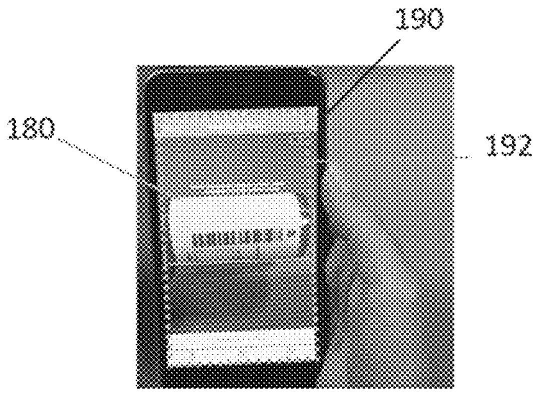
FIG. 13 is a view of one embodiment of an app on an external device.
Figure 14:
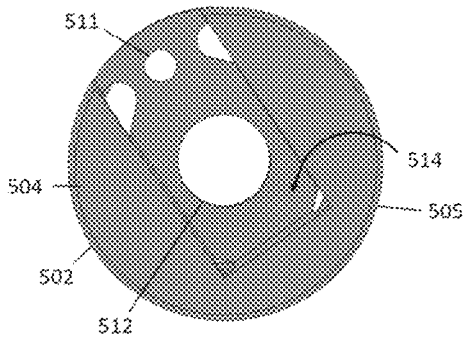
FIG. 14 is a top down view of another embodiment of a portion of a smart pill bottle cap.
Figure 15:
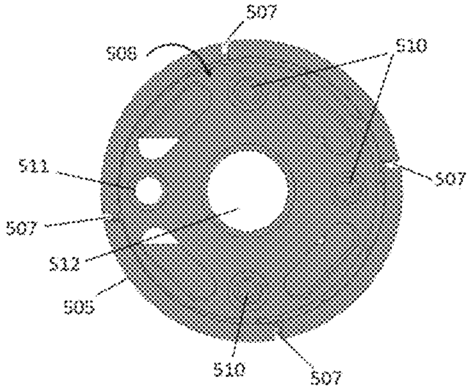
FIG. 15 is a bottom up view of the smart cap of FIG. 14.
Figure 16:
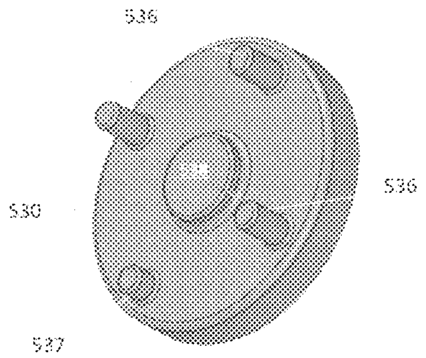
FIG. 16 is a perspective view of a guide plate of the smart cap of FIG. 14.
Figure 17:
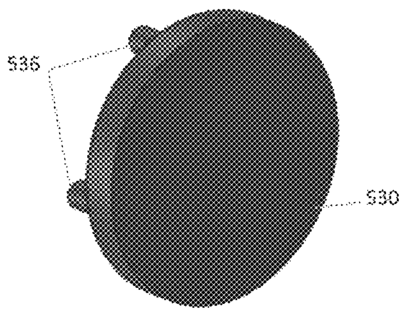
FIG. 17 is a perspective view of the guide place of FIG. 16.
Figure 18:
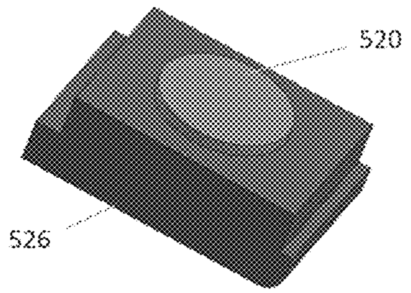
FIG. 18 is a perspective view of a monitoring mechanism, power source, and cover of the smart cap of FIG. 14.

For example, in one embodiment illustrated in FIG. 13, the external device 190 is a smartphone with a corresponding app 192 installed thereon for interacting with the smart cap 100. As will be appreciated by a person skilled in the art, the app 192 can be represented by pluralities of data points stored in memory on the external device 190 and executable by a processor on the device 190. The user (e.g., the patient, a doctor, a pharmacist, a clinician, etc.) can enter an identification of the pills 182 into the app 192 either manually by typing relevant information into the app or automatically by using a built-in camera of the smartphone 190 to take a picture of identifying information on a label of the pill bottle 180, for example by scanning a barcode on the pill bottle 180, that the smartphone 190 is configured to identify and use to identify the user and/or a type of the pills 182 in the bottle 180 (or to be in the bottle 180). The app 192 can then automatically retrieve and populate relevant information, such as a predetermined weight of one pill 182 (e.g., a standard weight as identified by an entity such as a manufacturer of the pill 182), predetermined weight of the pill bottle 180 (e.g., a standard weight as identified by an entity such as a manufacturer of the pill bottle 180), predetermined weight of the standard cap 185 (e.g., a standard weight as identified by an entity such as a manufacturer of the standard cap 185), any required parameters needed to ensure that the user gets the most efficient treatment, a number of pills 182 to be in the bottle 180 for a full prescription, any pharmaceutical agent associated with the identified prescription, a dosage (e.g., number of the pills 182 to be taken at one time), an identity of the user, etc.

In embodiments in which the smart cap 100 is configured to monitor weight, the app 192 (or other external device 190 if different from the smartphone 190 using the app 192) can be configured to use the predetermined weight of each of one pill 182, the bottle 180, and the standard cap 185 to determine a number of pills 182 remaining in the bottle 180 at the time of the weight sensing. The smart cap 100 will transmit the sensed weight to the smartphone 190, which can determine the number of pills 182 by subtracting the known weight of the bottle 180 and the known weight of the standard cap 185 from the received sensed weight and then dividing the result by the known weight of one pill 182 to arrive at the number of pills 182 remaining in the bottle 180. Therefore, in some embodiments, the smart cap 100 does not need to contain any information about the contents of the bottle saved in memory on the cap 100. Instead, the cap 100 merely transmits weight of the bottle 180 and any contents, and the app 192 (which can have information about the contents of the bottle 180 saved thereon) can then determine a number of pills 182 in the bottle 180. The app 192 can also apply any correction factors known to the smart cap 100 and/or the app 192 to the weight to, for example, correct the weight for known biasing factors, such as environmental conditions, pill lot variations, etc. In embodiments in which the smart cap 100 also monitors and transmits a sensed orientation, the app 192 can be configured to only perform the pill number calculation based on weight if the sensed orientation is indicative of the assembly being in the inverted position. However, as noted above, the sensed orientation can be used in some embodiments to accurately calculate weight even when the bottle 180 is in an angled orientation. In embodiments in which the smart cap 100 also monitors date and time, the weight data received by the app 192 can be date and time stamped to provide more detailed information about the pills 182, e.g., a date/time when pill(s) 182 were removed from the bottle 180 and presumably consumed by a user. Any other parameters monitored by the smart cap 100 can be similarly date/time stamped, such as temperature, humidity, etc., to determine whether the pills 182 underwent an excursion.

The app 192 can communicate the determined number of pills 182 remaining in the bottle 180 to the user via the smartphone 190 (e.g., via the app 192 running thereon), to a medical professional via a computer system accessible at a hospital or pharmacy, to various cloud applications, etc. This pill number information can then be used for any a variety of reasons, such as to track pill usage as indicated by pill number decreasing over time, to provide reminders to take or refill medication, to automatically request refills, to provide guidance to the user, etc.

In some embodiments, the smart cap 100 can pre-emptively account for any weight of the pill bottle 180 and the standard cap 185 such that only a weight of the pills 182 needs to be transmitted. For example, the known weight of the pill bottle 180 and the known weight of the standard cap 185 can be stored in the smart cap's memory 102*c*, and the smart cap's processor 102*a* can be configured to subtract the known weights of the bottle 180 and standard cap 185 from sensed weight and to transmit the calculated result to the external device 190 for the external device to calculate the pill 182 number. Alternatively, the known weight of one pill 182 can also be stored in the smart cap's memory 102*c*, and the smart cap's processor 102*a* can be configured to subtract the known weights of the bottle 180 and standard cap 185 from sensed weight, to divide the result by the known weight of one pill 182, and to transmit the calculated pill 182 number result to the external device 190. The external device 190 performing the subtraction and dividing calculations instead of the smart cap 100 may help reduce smart cap 100 cost be reducing an amount of needed memory and processing capability.

In some embodiments, when a bar code label is initially scanned, a unique identifier can be read from the label of the bottle 180 and transmitted wirelessly to the smart cap 100 through two-way communication with the external device 190. Such an act can tether the smart cap 100 and pill bottle 180 (and standard cap 185) to the corresponding external device 190 so that all subsequent communications to/from the smart cap 100 will only occur with the external device 190 with which the smart cap 100 has been tethered. This tethering approach can eliminate any possibility of data being transmitting to an incorrect external device.

In embodiments when the app 192 is being used, the smart cap 100 itself is not required to store any information about a prescription for the pills 182 or about the user (whether or not the pills 182 are prescription pills). The smart cap 100 can be used to sense one or more various parameters, such as a weight, orientation, etc. and transmit the sensed information to the app 192 via the smartphone 190, at which point the information is processed into relevant information such as a pill count. As such, when the bottle 180 is empty of pills 182, e.g., when the user finishes taking a prescription, the smart cap 100 can be reused and transferred to a new prescription without requiring the smart cap 100 to be reprogrammed for the new pill bottle. Instead, the user can perform one or more steps on the app 192 to set up the new prescription in the app 192 while leaving the operational parameters of the smart cap 100 the same. In such an embodiment, security is also enhanced because relevant information about the user and/or the prescription is not stored in the external device 190 instead of on the smart cap 100. The app 192 can also have access to a standard weight of the standard pill bottle 180 and a standard weight of the standard cap 185 as needed for accurate measurement.

Before and after pills 182 are removed, the user can be instructed to store the smart cap 100, standard pill bottle 180, and standard cap 185 assembly in the inverted orientation shown in FIG. 3, to allow the monitoring mechanism 120 to monitor a weight of the standard pill bottle 180, standard cap 185, and remaining pills 182. In some embodiments, correct orientation can be confirmed by the monitoring mechanism 120 as discussed above and, if the pill bottle 180 is incorrectly oriented, the user can be alerted, such as via the app 192.

The monitoring mechanism 120 is configured to be activated to take measurements and/or communicate measured data to the external device 190 through a variety of different mechanisms and at various different times. The monitoring mechanism 120 can be configured to be woken up from a power save mode and activated to take measurements and/or communicate with the external device 190 periodically, such as upon movement of the bottle 180 as detected by a motion sensor of the smart cap 100, at a preset amount of time after detection of movement of the bottle 180 as detected by a motion sensor of the smart cap 100, upon a measured change in weight, after receiving a request from the external device 190 to gather and transmit data, by having a button of the smart cap 100 manually pressed (such as the push-button 406) at predetermined times (e.g., once a day, a number of times a day corresponding to a number of times a day pills 182 are expected to be removed from the bottle 180 per the user's prescription, every hour, every other hour, twice a day, etc.), when the external device 190 comes into communication range with the smart cap 100, etc. Alternatively, the smart cap 100 can be configured to continuously gather sensed data in real-time and communicate the gathered data in real-time with its sensing. Such continuous gathering and communicating may allow for the most up to date data to be available for analysis but will typically require more power and processing capabilities on board the smart cap 100 than periodic monitoring and periodic communication.

Measurements and communication of measured information can occur simultaneously or at different times. For example, if the smart cap 100 is temporarily unable to communicate with the external device 190, such as by being out of communication range from the external device 190, etc., sensed data can be saved on the smart cap 100 (e.g., in the memory 102*c* thereof) until successful communication is possible. In such a scenario, the smart cap 100 can periodically wake up and advertise its presence. Whenever the external device 190 comes into proximity of the advertising signal, a communication session can be started between the smart cap 100 and external device 190 and any new data since a prior transmission (if any) can be transmitted from the smart cap 100 to the external device 190 (or vice versa) without requiring interaction from the user. Such passive transmission can increase ease of use for the user and ensure greater compliance than methods requiring user interaction to initiate data sensing and/or perform data transmissions.

While determining a number of remaining pills 182 is discussed above, sensor information from a variety of different sensors can also be communicated using the various sensors discussed previously. For example, the app can track date, timing, and amount of each dosage to ensure compliance to a dosage regimen or to provide reminders of when to take medication; movement of the pill bottle 182 to monitor any tampering; temperature, humidity, and other storage condition measurements to ensure pills are stored in appropriate environmental conditions, expiration alerts for any medication; a geographic location to assist in locating the bottle 180; compliance with a clinical protocol; remaining battery life of the smart cap 100; status or error messages from the smart cap 100; general compliance data to assist in designing more effective dosing regimens; etc. Additionally, while a smartphone and smartphone app are discussed above, sensor information can be communicated from the smart cap 100 to a variety of different systems, such as wireless internet networks, doctor or hospital networks, cell networks, other smart devices such as watches or other wearables, etc., and a variety of different applications can be used to analyze the received information, such as pharmacy or medical systems, etc.

A variety of different smart pill bottle cap configurations are also possible. FIGS. 14-18 illustrate another embodiment of a smart pill bottle cap that is configured and used similar to the smart cap 100 of FIGS. 1B-5. The smart cap includes a housing 502, a monitoring mechanism 520 (which in this illustrated embodiment includes a power source incorporated therein), a cover 526, and a guide plate 530. The housing 502 is similar to the housing 102 and has a base portion 504 and a sidewall 505 extending longitudinally therefrom that defines a hollow area 508 in which a standard cap, such as the standard cap 185, can be received and that includes longitudinal grooves 507 and cleats (obscured). The base portion 504 includes a monitoring cavity 514 into which the monitoring mechanism 520 can be placed and over which the cover 526 can close. A channel 512 extends through the base portion 504, which is configured to receive therein a center raised surface 538 protruding from the guide plate 530. A plurality of pilot cavities or holes 510 are also defined in an inward facing surface of the base portion 504 and are configured to receive guide protrusions 536 extending from the guide plate 530. Additionally, a secondary opening or channel 511 that is formed in the base portion 504 and extends entirely through the base portion 504 and is configured to receive therein a secondary guide protrusion 537 extending from the guide plate 530. The secondary guide protrusion 537 has a shorter length relative to the guide protrusions 536 (of which there are three in this illustrated embodiment). The secondary guide protrusion 537 and secondary opening 511 are configured as a key-like feature that ensures the guide plate 530 is received in the housing 502 in only a single possible orientation relative to the housing 502, e.g., an orientation in which the secondary guide protrusion 537 is positioned in the secondary opening 511.

Figure 19:
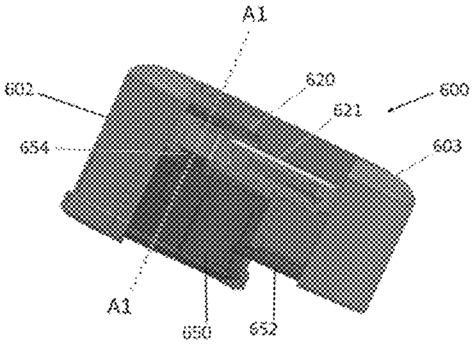
FIG. 19 is a perspective and partial cross-sectional side view of a portion of another embodiment of a smart pill bottle cap.
Figure 20:
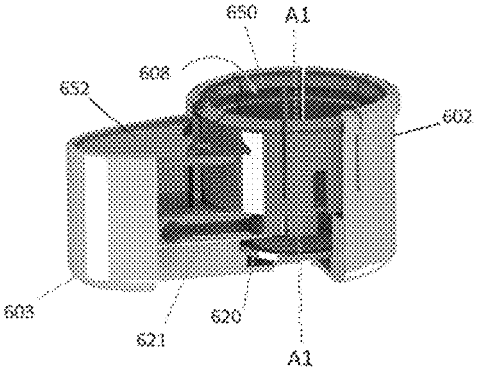
FIG. 20 is a perspective and partial cross-sectional perspective view of the smart pill bottle cap of FIG. 19.
Figure 21:
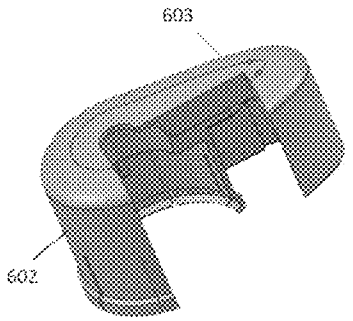
FIG. 21 is a perspective and partial cross-sectional side view of an outer housing of the smart cap of FIG. 19.
Figure 22:
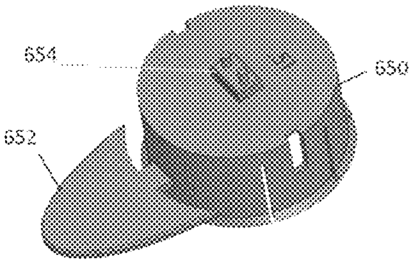
FIG. 22 is a perspective view of an inner housing of the smart cap of FIG. 19.
Figure 23:
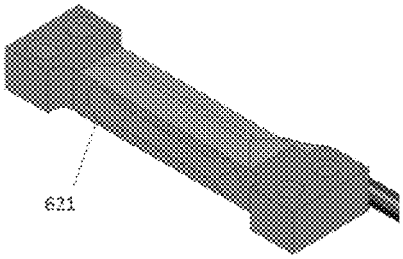
FIG. 23 is a perspective side view of a cantilever sensor of the smart cap of FIG. 19.
Figure 24:
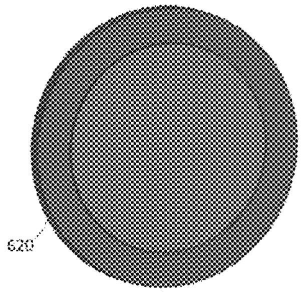
FIG. 24 is a perspective side view of a monitoring mechanism and power source of the smart cap of FIG. 19.

FIGS. 19 and 20 illustrate another embodiment of a smart pill bottle cap 600 configured and used similar to the smart cap 100 of FIGS. 1B-5. The smart cap 600 has a cantilever design and includes an outer housing 602 (also shown in FIG. 21), an inner housing 650 (also shown in FIG. 22), and a monitoring mechanism that includes an on-board power source 620 (also shown in FIG. 24) and a cantilever sensor 621 (also shown in FIG. 23). The inner housing 650 is received in the outer housing 602, and the inner housing 650 has a hollow area 608 configured to receive a standard pill bottle cap, such as the standard pill bottle cap 185, therein. The outer housing 602 includes a secondary lever housing 603 that extends substantially perpendicular to a longitudinal axis A1 of the smart cap 600, and the inner housing 650 has a lever 652 extending substantially perpendicular therefrom into the secondary lever housing 603. A person skilled in the art will appreciate that an element may not extend precisely perpendicularly but nevertheless be considered to extend substantially perpendicularly for any of a number of reasons, such as manufacturing tolerances and sensitivity of measurement equipment. The inner housing 650 also includes a sensor engagement protrusion 654 that extends from an outer surface opposite the cap cavity of the hollow area 608. The sensor engagement protrusion 654 engages the cantilever sensor 621, which extends from the sensor engagement protrusion 654 and into the secondary lever housing 603 substantially parallel to the lever 652 of the inner housing 650. A person skilled in the art will appreciate that an element may not extend precisely parallel but nevertheless be considered to extend substantially parallel for any of a number of reasons, such as manufacturing tolerances and sensitivity of measurement equipment. A PCB of the monitoring mechanism is disposed in engagement with the cantilever sensor 621 and between the cantilever lever 652 and an inner surface of the outer housing 602. The smart cap 600 is configured and used similarly to the smart cap 100 of FIGS. 1B-5 such that as force is applied to the inner housing 650 by the standard cap engaged with the smart cap 600, the cantilever sensor 621 measures the force, and the monitoring mechanism (e.g., a communication interface thereof) communicates the measurement to an external device.

Figure 25:
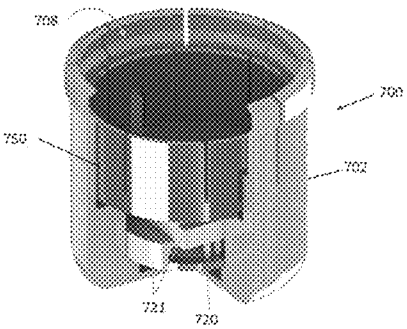
FIG. 25 is a perspective and partial cross-sectional bottom view of another embodiment of a smart pill bottle cap.

FIG. 25 illustrates another embodiment of a smart pill bottle cap 700 configured and used similar to the smart cap 100 of FIG. 1B-5. The smart cap 700 includes an outer housing 702, an inner housing 750, and a monitoring mechanism including a power source 720 and a sensor assembly 721. The inner housing 750 is received in the outer housing 702, and the inner housing 750 includes a hollow area 708 therein that is configured to receive therein a standard pill bottle cap, such as the standard pill bottle cap 185. The monitoring mechanism is disposed between the inner housing 750 and the outer housing 702 and is configured to measure force applied to the inner housing 750 during use.

In some embodiments utilizing an inner housing and outer housing structure such as in FIG. 25, the outer housing of the smart cap can be enlarged to ensure that the smart cap can engage pill bottles of a variety of different sizes and shapes, and the inner housing can act as a removable and replaceable adapter. In such embodiments, a variety of different inexpensive inner housings can be provided to users that can each engage the same outer housing that has the corresponding electronics, sensors, etc. therein. A user can therefore reuse one outer housing and its corresponding electronics while disposing of and replacing inner housings as needed to reduce costs and increase the user's ability to utilize the smart cap.

While the embodiments of FIGS. 1B-25 discussed above involve smart caps being attached to a pre-existing, standard cap, other embodiments can provide smart pill bottle caps that replace the pre-existing, standard cap, which may avoid any interference between the smart cap and a standard cap, reduce chances that the smart cap is not used (e.g., because a user forgets to attach the smart cap to a standard cap, etc.), reduce chances for misattachment of the smart cap to a standard pill bottle, and/or simply calculations since in calculating weight of any pills contained in the pill bottle weight of at least a standard pill bottle cap need not be considered, e.g., need not be subtracted from a weight sensed by the smart cap's monitoring mechanism.

Figure 26:
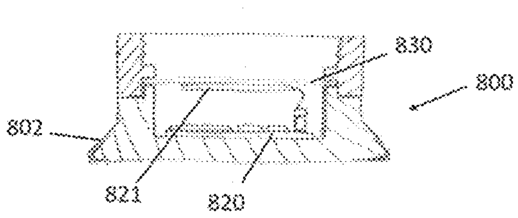
FIG. 26 is a cross-sectional side view of another embodiment of a smart pill bottle cap.

FIG. 26 illustrates one embodiment of a smart pill bottle cap 800 to directly attach to a standard pill bottle, e.g., without an intervening standard pill bottle cap. The smart cap 800 is configured and used similar to the smart cap 100 of FIGS. 1B-5 and includes a housing 802, includes a monitoring mechanism including a power source 820 and a sensor 821, and includes a separation member 830. The smart cap 800 is configured to screw directly onto a standard pill bottle, such as the standard pill bottle 180, with screw threads formed on an inner surface of the housing 802 in a hollow area thereof. The smart cap 800 can, however, attach to the standard pill bottle in other ways, such as by snapping thereon, etc. FIG. 26 illustrates the smart cap 800 in an inverse orientation, similar to FIG. 3 of the smart cap 100 above.

The separation member 830 in this illustrated embodiment is a flexible membrane positioned adjacent the sensor 821, which in this illustrated embodiment is a strain gauge configured to measure force. Similar to that discussed above regarding the smart cap 100 of FIG. 1B-5, the smart cap 800 is configured to measure the combined weight of the standard pill bottle attached to the smart cap 800 and any pills contained in the pill bottle due to force applied to the sensor 821. The flexibility of the separation member 830 allows pressure to be variably applied to the sensor 821 from vertically above when the assembly is in the inverted position. As illustrated in FIG. 26, the sensor 821 and the separation member 830 can be spaced vertically above the power source 820 to ensure that there is enough vertical clearance for the separation member 830 to flex as pressure is applied thereto. A wire runs between the power source 820 and the sensor 821 to provide power thereto.

As in this illustrated embodiment, the housing 802 of the smart cap 800 is configured to support the weight of the pill bottle when the smart cap and pill bottle assembly is in the inverse position such that the only downward weight on the separation member 830 is due to any pills in the pill bottle. Thus, the only weight being measured by the sensor 821 is the weight of any pills in the bottle. In such an embodiment, a known weight of the pill bottle need not be subtracted from the measured weight. The known weight of the pill bottle need not even be known by the processor that receives the sensed weight data.

Figure 27:
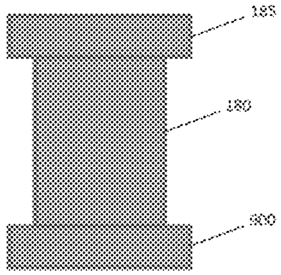
FIG. 27 is a cross-sectional side view of another embodiment of a smart pill bottle cap.

FIG. 27 illustrates yet another embodiment of a smart pill bottle cap 900. In this illustrated embodiment, the standard pill bottle, such as the standard pill bottle 180, is configured to use a standard pill bottle cap, such as the standard pill bottle cap 185 and be stored in the upright orientation, as illustrated in FIG. 27. To monitor pills 182 within the pill bottle 180, a bottom of the pill bottle 180 is received in the smart pill bottle cap 900 configured and used similar to the smart cap 100 of FIGS. 1B-5 with weight applied to the smart cap's measuring mechanism having known weights of the pill bottle 180 and standard cap 185 subtracted therefrom in determining a number of pills 182 remaining in the bottle 180. A cavity similar to cap cavity 115 formed in the smart cap 900 is configured to receive the bottom of the pill bottle 180, and a variety of engagement means can be used to secure the smart pill bottle cap 900 to the pill bottle 180, such as adhesives, snap or friction fit caused by various gripping pads or inserts in the cavity, sidewalls similar to sidewalls 105 with cleats similar to cleats 106, threaded engagements, snapping or hooking members, magnets, etc.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A pill bottle cap comprising:

a housing configured to attach to a cap of a pill bottle, the cap being configured to close the pill bottle and to be removed from the pill bottle to allow access to contents of the pill bottle, the housing including a sensor configured to, with the housing attached to the cap, measure a characteristic of the contents, and the housing including a communication mechanism configured to transmit data corresponding to the measured characteristic to an external device, wherein the housing has a cavity formed therein configured to receive the cap of the pill bottle therein, the housing has a guide plate disposed between the sensor and the cavity, and the guide plate is configured to receive a weight of at least the contents of the pill bottle and apply the weight of the contents to the sensor.

2. The pill bottle cap of claim 1, wherein the housing attached to the cap is configured to be stored in an inverted position with the housing resting against a horizontal surface and the pill bottle and cap extending above the housing to allow the sensor to measure the weight without sensing a weight of the pill bottle or the cap.

3. The pill bottle cap of claim 1, wherein the sensor includes a force-sensing resistor.

4. The pill bottle cap of claim 1, wherein the sensor includes a load cell.

5. The pill bottle cap of claim 1, wherein the sensor includes a pressure sensor.

6. The pill bottle cap of claim 1, wherein the sensor is an ultrasonic sensor, and the characteristic includes a distance between the sensor and the contents.

7. The pill bottle cap of claim 6, wherein the housing attached to the cap is configured to be stored in an upright position with the pill bottle resting against a horizontal surface with the housing and cap being located above the pill bottle.

8. The pill bottle cap of claim 1, wherein the sensor includes a single sensor.

9. The pill bottle cap of claim 1, wherein the sensor includes a plurality of sensors.

10. The pill bottle cap of claim 9, wherein the sensor includes at least two of an accelerometer, a sensor configured to measure weight, and an ultrasonic sensor.

11. The pill bottle cap of claim 10, wherein the sensor includes at least one of a temperature sensor, a humidity sensor, and a geographic location sensor.

12. The pill bottle cap of claim 1, wherein the external device is a smartphone.

13. The pill bottle cap of claim 1, wherein the communication mechanism is configured to automatically transmit data to the external device when the communication mechanism connects to the external device.

14. The pill bottle cap of claim 1, wherein the communication mechanism is configured to communicate using Bluetooth communication, cellular communication, Wi-Fi communication, near field communication, or radio frequency identification communication.

15. The pill bottle cap of claim 1, further comprising current date and time circuitry configured to gather time and date data, the communication mechanism being configured to transmit the time and date data to the external device.

16. The pill bottle cap of claim 1, wherein the housing is configured to non-removably attach to the cap.

17. The pill bottle cap of claim 1, wherein the housing is configured to removably attach to the cap such that the housing is configured to be removed from the cap and be attached to a second cap of a second pill bottle.

18. The pill bottle cap of claim 1, wherein the guide plate has a plurality of posts protruding therefrom, the housing has a plurality of holes defined therein, and the plurality of posts are configured to be received in the plurality of holes.

19. A pill bottle cap comprising:

a housing configured to attach to a cap of a pill bottle, the cap being configured to close the pill bottle and to be removed from the pill bottle to allow access to contents of the pill bottle, the housing including a sensor configured to, with the housing attached to the cap, measure a characteristic of the contents, and the housing including a communication mechanism configured to transmit data corresponding to the measured characteristic to an external device, wherein the housing is configured to removably attach to the cap such that the housing is configured to be removed from the cap and be attached to a second cap of a second pill bottle, and wherein the housing has a cavity formed therein configured to receive the cap of the pill bottle therein.

20. The pill bottle cap of claim 19, wherein a plurality of longitudinal grooves are formed in the housing surrounding the cavity, and a plurality of cleats protrude from the housing into the cavity, the plurality of longitudinal grooves are configured to allow the housing to flex radially outward during placement and removal of the cap of the pill bottle within the cavity, and the plurality of cleats are configured to engage the cap of the pill bottle when the cap is received within the cavity.

21. A smart pill bottle cap comprising:

a housing configured to attach to a non-electric cap of a pill bottle, the non-electric cap being configured to close the pill bottle and to be removed from the pill bottle to allow access to contents of the pill bottle, the housing including a sensor configured to measure a weight, the housing having a cavity formed therein configured to receive the non-electric cap of the pill bottle therein, the housing having a guide plate disposed between the sensor and the cavity, the guide plate being configured to receive a weight of at least the contents of the pill bottle and apply the weight of the contents to the sensor, the housing being configured to, with the housing attached to the non-electric cap, measure a characteristic of the contents, the characteristic including a weight of the contents, and the housing including a communication mechanism configured to transmit data corresponding to the measured characteristic to an external device.

* * * * *